United States Patent
Matyas, Jr. et al.

(10) Patent No.: US 6,507,912 B1
(45) Date of Patent: Jan. 14, 2003

(54) PROTECTION OF BIOMETRIC DATA VIA KEY-DEPENDENT SAMPLING

(75) Inventors: Stephen Michael Matyas, Jr., Manassas, VA (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,700

(22) Filed: Jan. 27, 1999

(51) Int. Cl.$^7$ .............................. H04K 1/00; G06K 9/64; H04L 9/08
(52) U.S. Cl. ....................... 713/200; 713/201; 382/115; 382/124; 382/190; 382/209; 382/215; 382/276
(58) Field of Search ................................ 713/200, 201, 713/186, 185, 182; 382/115, 116, 117, 118, 124, 190, 191, 209, 215, 217, 218, 276, 298, 299

(56) References Cited

U.S. PATENT DOCUMENTS

| | | | | |
|---|---|---|---|---|
| 5,325,318 A | * | 6/1994 | Harris et al. ................. | 708/313 |
| 6,076,167 A | * | 6/2000 | Borza .......................... | 713/155 |
| 6,167,517 A | * | 12/2000 | Gilchrist et al. ............. | 713/182 |
| 6,202,151 B1 | * | 3/2001 | Musgrave et al. ........... | 713/170 |
| 6,278,746 B1 | * | 8/2001 | Velez et al. .................. | 329/306 |

FOREIGN PATENT DOCUMENTS

| | | | |
|---|---|---|---|
| EP | 0 008 086 | 2/1980 | |
| HU | 0216231 B | 5/1999 | ............. H04L/9/08 |
| WO | WO 97/25800 | 7/1997 | |
| WO | WO 98/12670 | 3/1998 | |

OTHER PUBLICATIONS

"*OTI: On Track Innovations Ltd.*", http://www.oti.co.il/print.html, 1999, 11 pp.

"*Welcome to the True Face of Security*", Miros, Inc., http://www.miros.com, 1999, 3 pp.

Davida et al., "On Enabling Secure Applications Through Off–line Biometric Identification", IEEE, 1998, pp. 148–157.

Brown et al., "Biometric Encryption: Information Privacy in a Networked World", EDI Forum: The Journal of Electronic Commerce, vol. 10, No. 3, 1997, pp. 37–43.

Kim, "Biometerics, It is a Viable Proposition for Indentity Authentication and access Control", Computers & Security, vol. 14, 1995, pp. 205–214.

George et al., "A Robust Speaker Verification Biometric", IEEE, 1995, pp. 41–46.

\* cited by examiner

*Primary Examiner*—Ly V. Hua
(74) *Attorney, Agent, or Firm*—Myers Bigel Sibley & Sajovec; Jeanine S. Ray-Yarletts

(57) ABSTRACT

Key-dependent sampling of a biometric characteristic is performed at a client, to thereby generate key-dependent biometric data samples. The key-dependent biometric data samples are then transmitted from the client to a server. By sampling the biometric characteristic at the client in a key-dependent manner, the key-dependent biometric data samples may be transmitted from the client to the server without the need for additional encryption and/or a signature. A key is preferably transmitted from the server to the client. The key is then used to perform the key-dependent sampling of the biometric characteristic at the client. The key-dependent sampling may be performed by sampling the biometric characteristic at a sampling frequency that is a function of the key. Alternatively, the key can be applied to the sampled biometric data, to thereby generate the key-dependent biometric data samples that are a function of the key. The key is preferably used to perform nonlinear key-dependent sampling of the biometric characteristic at the client, for example by using the key to determine the sampling frequency and also using the key to apply a nonlinear function to the sampled biometric data. Further encryption of the biometric data and/or the use of a signature with the biometric data need not be performed.

45 Claims, 4 Drawing Sheets

PROTECTION OF BIOMETRIC DATA VIA KEY-DEPENDENT SAMPLING

FIELD OF THE INVENTION

This invention relates to systems, methods and computer program products for identifying and/or verifying an individual, and more specifically to systems, methods and computer program products that use biometric data to identify and/or verify an individual.

Background of the Invention

Biometric information is now being used as an identification and/or verification technique for individuals. As is well known to those having skill in the art, biometric information is one or more behavioral and/or physiological characteristics of an individual. Biometric identification and/or verification uses a data processing system to enable automatic identification and/or verification of identity by computer assessment of a biometric characteristic. In biometric verification, biometric information is verified for a known individual. In biometric identification, biometric information for an individual is compared to known biometric information for many individuals in order to identify the individual.

Biometric identification/verification systems, methods and computer program products can measure one or more of the following behavioral and/or physiological characteristics of an individual: fingerprint, hand geometry, iris pattern, facial features, voice characteristics, handwriting dynamics, earlobe characteristics and keystroke dynamics. Other biometric characteristics may be used. Applications using biometric technologies include biometric check cashing machines, payment systems that substitute biometric data for personal identification numbers, access control systems that use biometric data, biometric employee time and attendance recording and biometric passenger control for transportation. Many other applications may utilize biometric information for identification and/or verification. See the publications entitled "*Biometrics, Is it a Viable Proposition for Identity Authentication and Access Control*", to Kim, Computers & Security, Vol. 14, 1995, pp. 205–214; "*A Robust Speaker Verification Biometric*", to George et al., Proceedings, the IEEE $29^{th}$ International Carnahan Conference on Security Technology, October 1995, pp. 41–46; "*On Enabling Secure Applications Through Off-line Biometric Identification*", to Davida et al., Proceedings of the IEEE Computer Society Symposium on Research in Security and Privacy, 1998, pp. 148–157; and "*Biometric Encryption: Information Privacy in a Networked World*", to Brown et al., EDI Forum: The Journal of Electronic Commerce, v. 10, No. 3, 1997, pp. 37–43.

FIG. 1 is a block diagram of conventional biometric identification and/or verification systems, methods and computer program products. In FIG. 1, biometric identification and/or verification is presented in a "client-server" environment using Internet plug-ins. As is well known to those having skill in the art, a server is a computer and/or a software program running on a computer and/or special purpose hardware that provides a specific kind of service to a client. A client is a computer and/or a software program running on a computer and/or special purpose hardware that is used to contact and obtain data from a server over a communications network. The client and server each may comprise one or more mainframe, midrange and/or personal computers and/or one or more applications running on one or more of these computers and/or special purpose hardware. The client and server may run on the same computer or on different computers. The communications network may be a local area network, a wide area network, the Internet, an application interface and any other communication mechanism that may be used to connect a client and a server. When using the Internet as a communication network between a client and a server, a web browser may be used as a client and a web server may be used as a server.

Referring now to FIG. 1, a client 10 communicates with a server 12 over the Internet 14. The client 10 includes a browser 16, and the server 12 includes a web server 18. When biometric identification and/or verification is used for electronic commerce between clients and servers over the Internet, a client biometric plug-in 22 and a server biometric script 24 may be used. For example, a biometric plug-in for a Netscape browser, such as Netscape Communicator or Netscape Navigator, may be used. At the server, a Uniform Resource Locator (URL) from the client invokes a script which can include and/or invoke one or more application programs to perform biometric functions. The design and use of plug-ins and scripts are well known to those having skill in the art and need not be described further herein.

Still referring to FIG. 1, the client biometric plug-in 22 includes biometric data acquisition 32 that performs sampling of a biometric characteristic at the client to generate samples related to the biometric characteristic. In order to provide secure transmission of the samples from the client 10 to the server 12, an encryption module 34 may use conventional encryption techniques such as the Data Encryption Standard (DES) algorithm to encrypt the samples. Added security may be obtained using a signature module 36, which may use an RSA public key algorithm or other conventional signature algorithm to add a signature to the encrypted samples. Accordingly, the client biometric plug-in transmits encrypted and signed samples, denoted ENC(SAMPLES), SIGNED in FIG. 1, from the client 10 to the server 12 over the Internet 14 using the browser 16 and the web server 18.

At the server 12, the server biometric script 24 includes and/or can invoke a signature verification module 46 that verifies the signature, for example using the RSA public key algorithm, and a decryption module 44 that decrypts the encrypted samples, for example using the DES algorithm. The samples are then applied to a template compare module 42 which contains therein a plurality of templates T1–Tn. Techniques for comparing templates to verify biometric data are well known to those having skill in the art and need not be described further herein.

Unfortunately, the use of encryption and/or signatures may be disadvantageous in biometric applications. For example, if the biometric data is 1.2K byte fingerprint data that is encrypted on a smart card, and is transmitted to a finger-scan reader for verification, the RSA signature may take more power and time, and may run the risk of signal corruption. DES encryption also may use complex key management techniques in order to establish a common secret encryption key at the client and at the server. Thus, the use of high security algorithms, such as DES and RSA algorithms may increase the cost and/or complexity of the overall biometric application. As the cost of biometric technology decreases, the cost of security may become a dominant factor in inhibiting the widespread use of biometric technology. Moreover, in some cases, the use of complex high-speed encryption, with its associated high cost, may even be unwarranted. Accordingly, it would be desirable to provide systems, methods and computer program products that can secure the biometric data during transmission, without unduly increasing the cost and/or complexity of the biometric application.

SUMMARY OF THE INVENTION

It is therefore an object of the present invention to provide improved biometric identification and/or verification systems, methods and computer program products.

It is another object of the present invention to provide biometric identification and/or verification systems, methods and computer program products that need not use encryption and/or signatures to transmit biometric data from a client to a server.

These and other objects are provided, according to the present invention, by performing key-dependent sampling of a biometric characteristic at the client, to thereby generate key-dependent biometric data samples. The key-dependent biometric data samples are then transmitted from the client to the server.

The present invention stems from a realization that in order to transmit biometric data from a client to a server, a biometric characteristic is generally sampled at the client. By sampling the biometric characteristic at the client in a key-dependent manner, the key-dependent biometric data samples may be transmitted from the client to the server without the need for additional encryption and/or a signature.

According to the invention, a key is preferably transmitted from the server to the client. The key is then used to perform the key-dependent sampling of the biometric characteristic at the client. The key-dependent sampling may be performed by sampling the biometric characteristic at a sampling frequency that is a function of the key. Alternatively, the key can be applied to the sampled biometric data, to thereby generate the key-dependent biometric data samples that are a function of the key. In a preferred embodiment, the key is used to perform nonlinear key-dependent sampling of the biometric characteristic at the client, for example by using the key to determine the sampling frequency and also using the key to apply a nonlinear function to the sampled biometric data. Nonlinear function may be a one-way function such as a hash function. Further encryption of the biometric data and/or the use of a signature with the biometric data need not be performed.

At the server, the key is also applied to at least one template, to thereby obtain key-dependent biometric data template samples. A comparison is then made between the key-dependent biometric data and the at least one key-dependent biometric data template samples at the server, in order to identify and/or verify the biometric characteristic.

The key may be transmitted from the server to the client in an unsecured manner (in the clear). A new key is preferably transmitted prior to each biometric characteristic sampling. Alternatively, if encryption is already present, the key may be encrypted. The key may include more than one value that is used to perform key-dependent sampling of biometric characteristics. For example, if the nonlinear sampling function is a cosine function, the frequency and phase of the cosine function may be transmitted as the key, to govern the sampling rate and the function that is applied to the sampled biometric data. Alternatively, if the client and the server both share a secret value, the key may be a random value that is transmitted from the server to the client in the clear. The random value may then be used in combination with the secret value, to perform key-dependent sampling.

Accordingly, biometric data may be securely transmitted from a client to a server without requiring complex encryption and/or signatures. Secure electronic commerce may thereby be provided in an efficient manner. It will be understood that the present invention may take the form of systems, methods and/or computer program products.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as systems (apparatus), methods and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
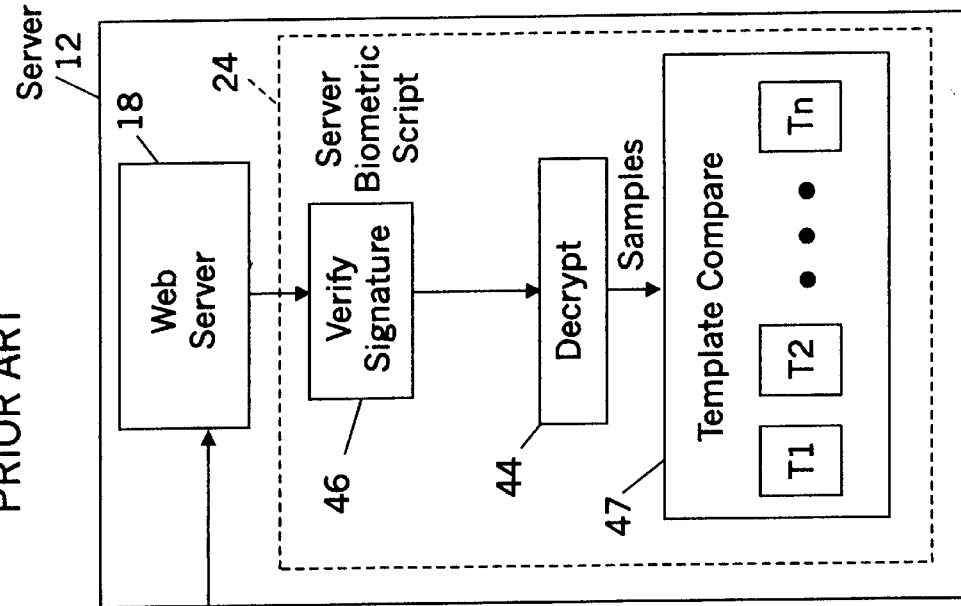
FIG. 1 is a block diagram of conventional Internet-based client server biometric systems, methods and computer program products.
Figure 1:
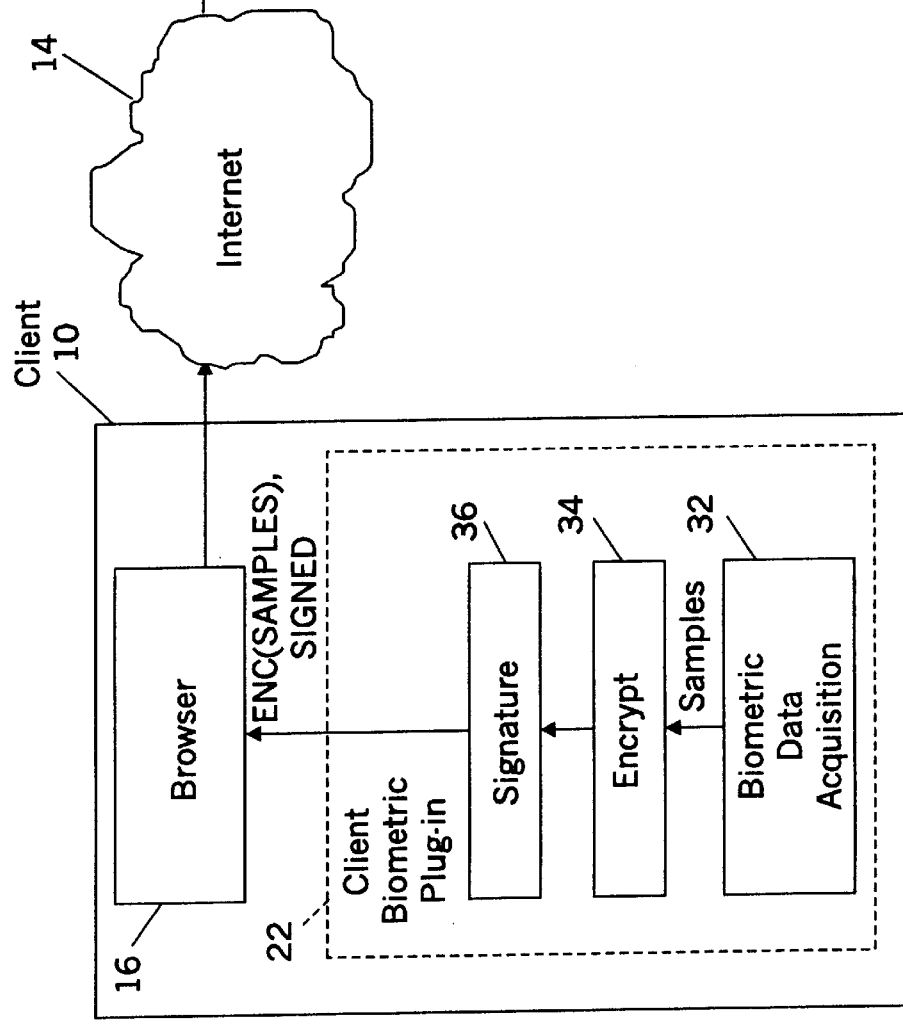
Figure 2:
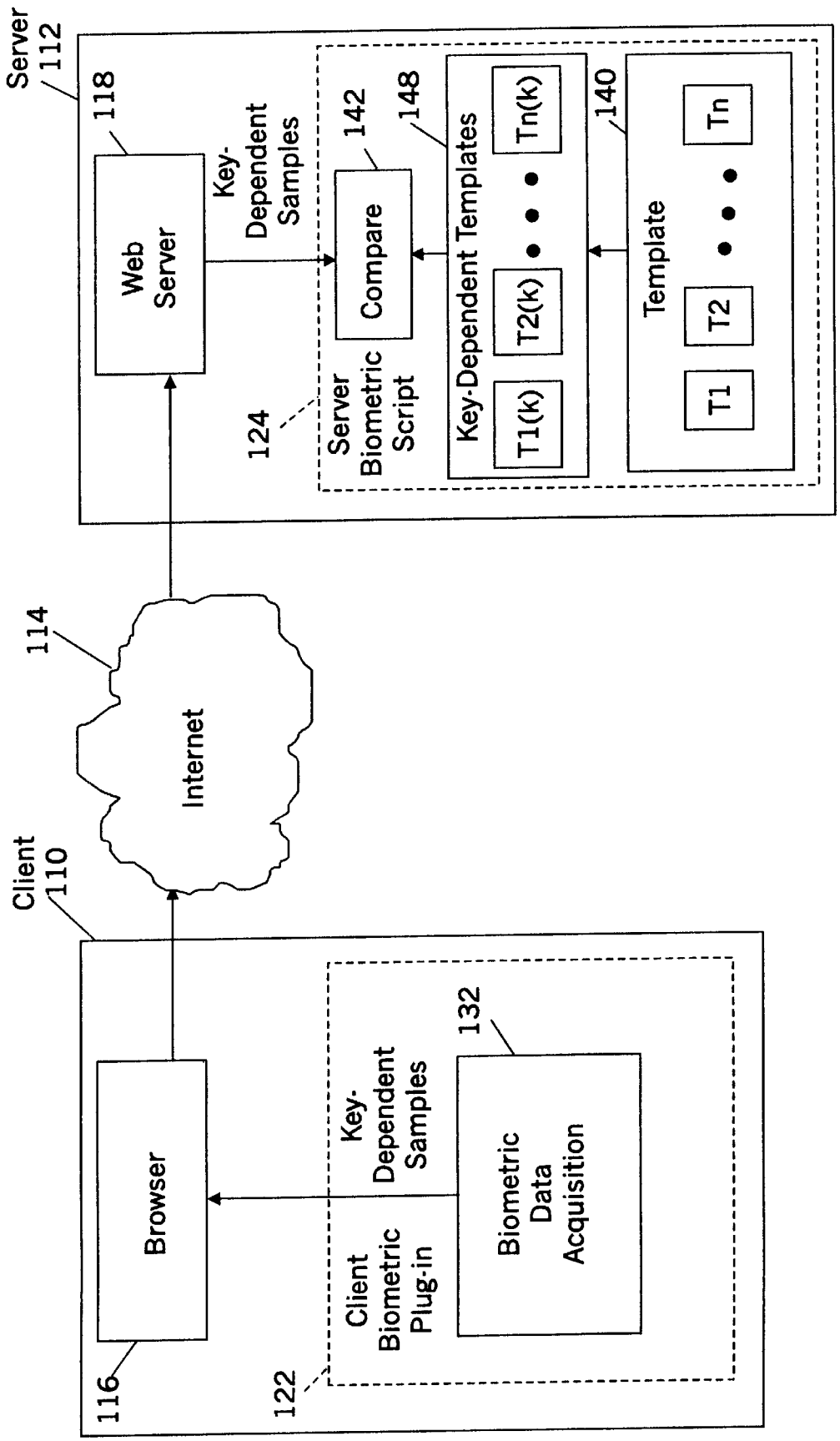
FIG. 2 is a block diagram of Internet-based client server biometric systems, methods and computer program products according to the present invention.

Referring now to FIG. 2, client-server systems, methods and computer program products for securely transmitting biometric data according to the present invention will now be described. As was already described above, the client 110 and server 112 may be mainframe, midrange and/or personal computers and/or one or more applications running on one or more of these computers and/or special purpose hardware. The client 110 and the server 112 may run on the same computer. However, for purpose of illustration, FIG. 2 illustrates an electronic commerce system method and computer program product using the Internet 114 to transmit biometric data from the client 110 to the server 112 using a web browser 116 at the client 110 and a web server 118 at the server 112.

Still referring to FIG. 2, the client 110 includes a client biometric plug-in 122 including biometric data acquisition 132 that performs key-dependent sampling of a biometric characteristic at the client, to thereby generate key-dependent biometric data samples. The key-dependent samples may be transmitted to the server 112 over the Internet 114 without the need of additional encryption using an encryption algorithm such as the DES algorithm and without the need for a signature using a public-key algorithm such as the RSA algorithm.

At the server 112, a server biometric script 124 obtains the key-dependent samples from the web server 118. Key-dependent sampling of at least one template T1–Tn is performed to obtain at least one key-dependent template T1(k)–Tn(k) at Blocks 140 and 148 respectively. A template compare module 142 compares the at least one key-dependent template T1(k)–Tn(k) with the key-dependent samples that are obtained from the web server 118, in order to verify and/or identify the biometric data. The server biometric script can include and/or invoke one or more application programs to obtain templates (Block) 140, generate key-dependent templates (Block 148) and perform a comparison (Block 142). Alternatively, the application program(s) can interface an Application Program Interface (API) that provides hardware and/or software cryptographic services. The design and operation of scripts are well known to those having skill in the art and need not be described further herein.

Figure 3:
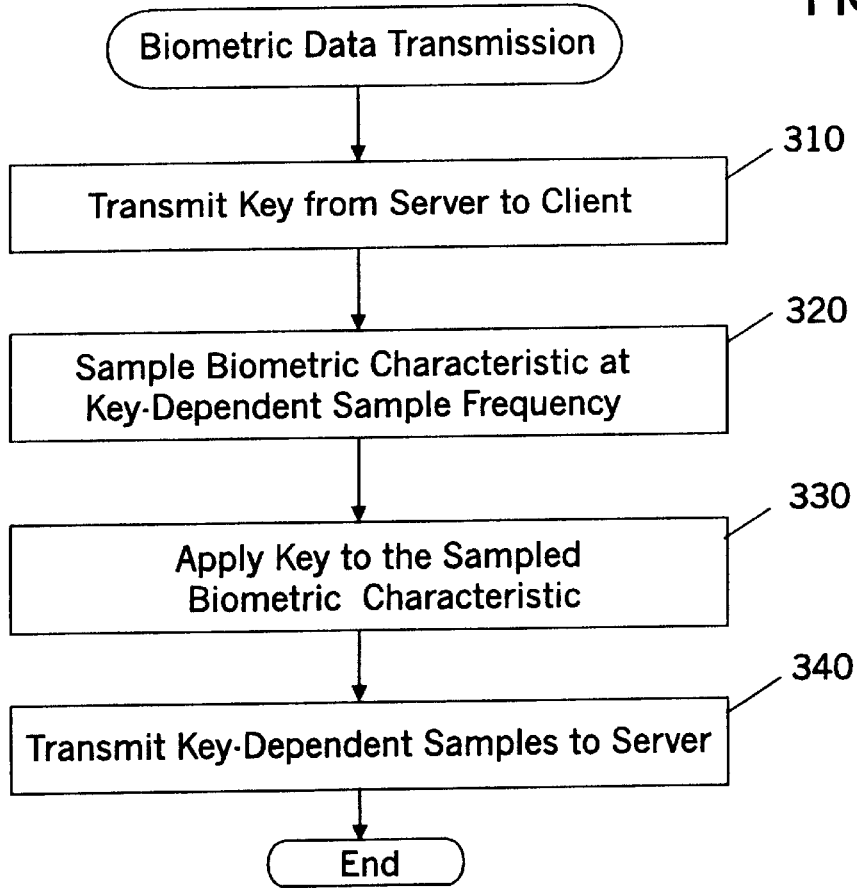
FIG. 3 is a flowchart illustrating biometric data transmission according to the present invention.
Figure 5:
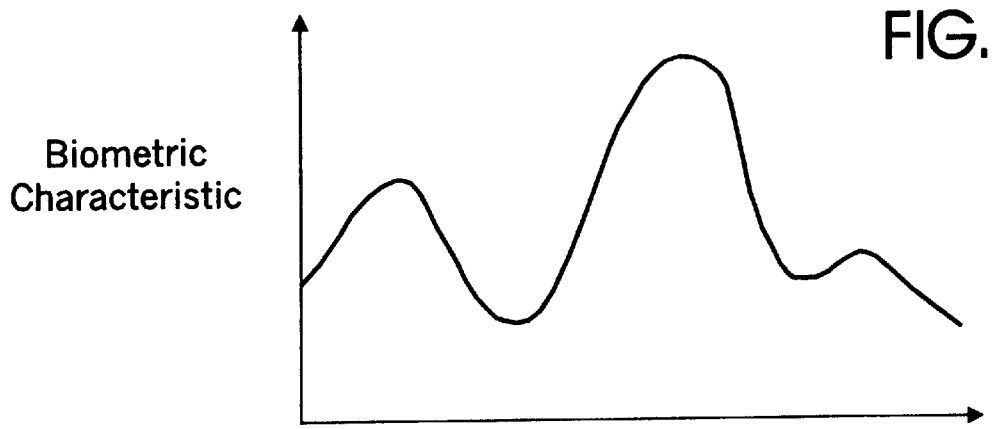
FIG. 5 graphically illustrates a conventional biometric characteristic.
Figure 6:
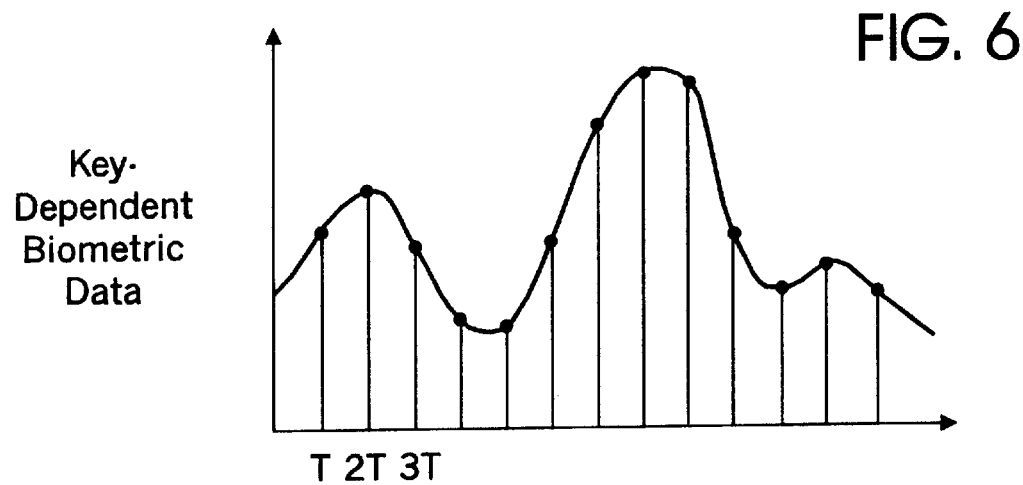
FIGS. 6 and 7 graphically illustrate generation of key-dependent biometric data according to the present invention.

Referring now to FIG. 3, biometric data transmission according to the present invention will now be described. As shown at Block 310, a key is first transmitted from the server 112 to the client 110. As will be described in detail below, the key can be a single random number, a plurality of random numbers or other combinations of values, that can be used to set the sampling frequency and/or other sampling parameters in a nonlinear function that is used to perform nonlinear key-dependent sampling of the biometric characteristic at the client. Thus, at Block 320, the biometric characteristic is sampled at a key-dependent sample frequency. For example, a biometric characteristic, which is shown in FIG. 5 as a function of time and/or space, is sampled at a sample frequency T in FIG. 6, that is a function of the key. Thus, the key T may be transmitted from the server 112 to the client 110, to thereby provide a sampling frequency T at which the biometric characteristic is sampled. The actual values of the key-dependent biometric data samples are shown by dots in FIG. 6.

Figure 7:
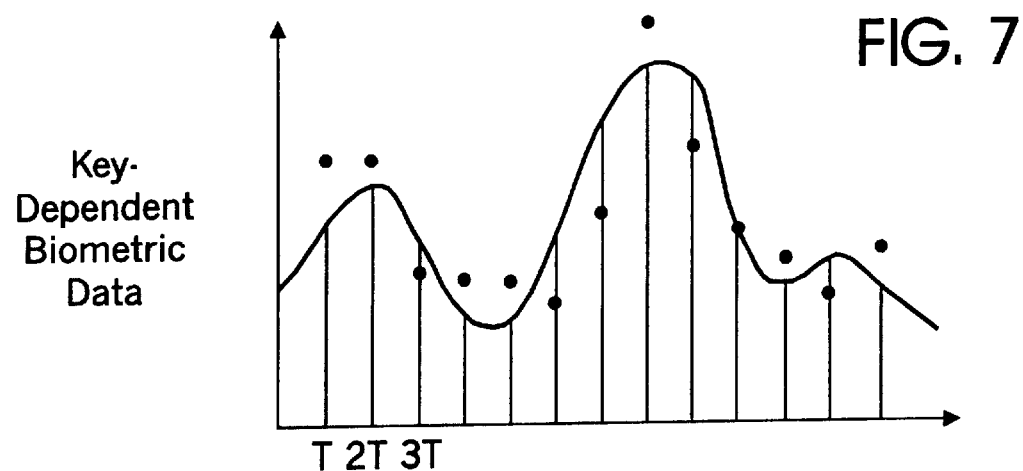

Referring now to Block 330 of FIG. 3, the key itself may also be applied to the sampled biometric characteristic so that the actual values that are obtained differ from the actual values of the key-dependent biometric data by a nonlinear function. Thus, as shown in FIG. 7, the key is applied to the sampled biometric data of FIG. 6, to thereby generate key-dependent biometric data samples, shown in dots in FIG. 7. The key-dependent biometric data samples are preferably nonlinearly related to the actual biometric data samples of FIG. 6. They may also be a one-way nonlinear function of the biometric data samples, such as a hash function. Finally, as shown in Block 340 of FIG. 3, the key-dependent samples are transmitted to the server 112.

Figure 4:
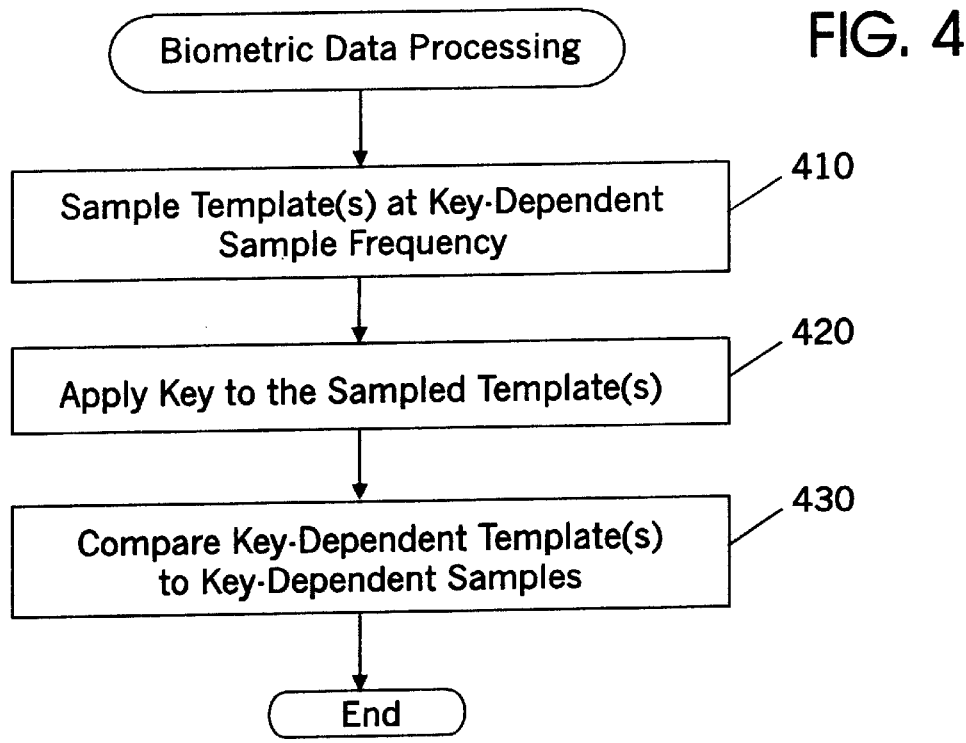
FIG. 4 is a flowchart illustrating biometric data processing according to the present invention.

At the server 112, biometric data processing takes place as shown in FIG. 4. At Block 410, one or more of the templates T1–Tn are sampled at the key-dependent sample frequency, and at Block 420, the key is applied to the sample template (s), to thereby generate the key-dependent template(s) T1(k) –Tn(k) of FIG. 2. Finally, at lock 430, the key-dependent template(s) 148 are compared to the key-dependent samples that are obtained from the web server 118, to thereby verify and/or identify the biometric data.

Referring again to FIGS. 2–7, a specific example will now be described, wherein the biometric characteristic of FIG. 5 is a continuous input speech signal v(T), where T is time. A sensing device in the biometric data acquisition module 132 converts the input speech signal into a binary code representing a quantized amplitude value closest to the amplitude of the signal every T seconds, where T is the sampling period. Thus, the sampling frequency is F=1/T hertz. The sampling operation is made a nonlinear function of the sampling frequency, so that the sampling frequency can be used as the key for the operation. For example, a cosine function may be used to obtain key-dependent samples of the biometric characteristic as follows:

$$c(n) = v(n.T) \times \cos[\pi \times (n.F + F_0)] \text{ for } n \geq 0$$

where $c(n)$ is the key dependent sample at point n, $v(n.T)$ is the sampled signal at point n, and $F_0$ is the phase shift.

Thus, the key-dependent samples $c(n)$ depend on the key frequencies F and $F_0$ in a nonlinear way. The key-dependent samples are transmitted form the client 110 over the Internet 114 using the browser 116, and are received at the server 112 by the web server 118.

For identification and/or verification, at the server 112, the key frequencies F and $F_0$ are used to produce at least one key-dependent template T1(k)–Tn(k) from at least one of the prestored templates T1–Tn by key-dependent sampling of the template data, as was described above. For verification, a key-dependent template and the key-dependent samples are compared to determine if both are from the same user. Identification can be performed in a similar manner, but in this case the key may be used to produce many key-dependent templates from the prestored templates. Then, the key-dependent samples are compared to the key-dependent templates, to determine the identity of the user.

It will be understood by those having skill in the art that prior to performing the biometric sampling operation, the key should be installed or initialized at both the client and server systems 110 and 112 respectively. If cryptography is already present at the client and server for other reasons, then the server can use public-key or symmetric-key cryptography to send the key (for example F and $F_0$) to the server, and thereby provide enhanced security to the key. Alternatively, the key may be transmitted in the clear from the server 112 to the client 110. Clear transmission of the key may still allow secure transmission of biometric data if the key space is large enough to provide that an attacker will be unable to intercept enough transmitted biometric data and keys to forge a biometric sample for a new intercepted key. If the biometric sample is rich in information content, and it contains a large amount of data, then key-dependent sampling need not interfere with the robustness of the user identification or user verification, in which the key-dependent samples and the key-dependent templates are compared or analyzed to determine whether they are biometric data from the same user. Thus, as the amount of information content and biometric samples continue to increase, it may be more feasible to transmit the key in the clear from the server 112 to the client 110.

In another alternative, the key is not transmitted in the clear. Rather, the client 110 and the server 112 share a secret value S. The server 112 sends a random value R to the client 110 in the clear. The random value is used in combination with the secret value, to perform key-dependent sampling. In the speech sampling example described above, the derived key can be the key frequencies F and $F_0$. This can be achieved, for example by using a hash function, such as the conventional SHA-1, over the concatenated S and R values as follows:

$$key = SHA\text{-}1(S, R)$$

It will be understood that in this key distribution method, the common secret value S is first initialized in each device. However, this technique may have advantages because the keys are not transmitted in the clear, so that an attacker may not have a clue about the key value produced from S and R, assuming that R is large enough so that it is unlikely to repeat. Hence, the attacker generally will not know which key-dependent biometric sample to substitute for his own key-dependent biometric sample in order to impersonate another user. Moreover, the key derivation algorithm may be simple and straightforward. Thus, while the client and server may need to implement the key derivation algorithm, they need not implement an encryption algorithm.

Identification/verification may assume that each key-dependent biometric sample and each associated key-dependent template are uniquely paired together and that a key-dependent biometric sample obtained for a first key will not succeed in being validated against a key-dependent template for a different second key. Hence, the key-dependent sample should be constructed so that the obtained biometric samples are different for each key, i.e., different enough so that stated granularity in the identification/validation procedure may be achieved.

In the voice sampling example described above, if the keys are chosen in such a way that two key-dependent sample sets are different in at least one sample point, a key-dependent biometric sample obtained for a first key generally will not succeed in being validated against a key-dependent template for a different second key. This is because for at least one sample point i, $c'(i) \neq c''(i)$, i.e. the following inequality holds:

$$c'(i)=v'(i.T') \times \cos[\pi x(F'+F_0')] \neq c''(i)=v''(i.T'') \times \cos[\pi x(i.F''+F_0'')], \text{ for some } i.$$

Given that key frequency range is large, picking the key frequencies at random may satisfy the above-described desire to obtain different biometric samples for each key with high probability.

Another biometric system in which the present invention maybe used is a computer program product marketed by Miros Inc., Wellesley, Mass., called TrueFace, which can secure Internet website access. See www.miros.com. TrueFace uses Microsoft ActiveX technology to download facial capture software to the browser of a surfing computer user. The ActiveX component returns the captured data to the site where the TrueFace server component can verify the surfer against an enrolled image. The server software runs on Windows NT, whereas the client is Microsoft's Internet Explorer or Netscape Navigator using a plug-in. A possible attack against this biometric system may be for the attacker to first intercept a biometric sample during transmission (client to server) and then to impersonate that other user by performing an active line attack in which the attacker biometric data is replaced by the intercepted biometric data.

Instead of encrypting transmitted biometric data, the biometric data can be protected through the use of key-dependent sampling according to the invention. In that case, the server would generate a key and communicate it to the browser, for example along with the facial capture software downloaded from the server. The facial capture software in turn would use the key to perform a key-dependent sampling operation to obtain a corresponding key-dependent biometric facial sample, which would then be sent in the clear to the server. The server would use the key to filter a stored biometric template to produce key-dependent biometric template samples, which would then be compared or analyzed against the key-dependent biometric facial sample received from the client to determine whether both pieces of biometric data came from the same user. If the number of keys and key-dependent biometric facial samples is large enough, then an attacker should not be able to forge key-dependent biometric facial data for a key that it had not already seen (or intercepted).

In another example, a smart card manufacturer On Track Innovations (OTI) has integrated finger biometrics to its "Eyecom" contactless smart card using Identix's "Fingerscan" technology. See www.oti.co.il. The exchange of data between the card and the read terminal takes place "on the fly" with only a short contactless power window to exchange the biometric template. The 1.2K byte template is encrypted for wireless transmission to the Fingerscan reader for verification, using either DES or RSA public key encryption. The verification process is private and localized, without the use of any network.

The present invention may be applied as follows: The Fingerscan reader may generate a key which may then be communicated in the clear to the smart card. In response, the smart card would use the key to filter the stored biometric template to produce a unique key-dependent biometric template, which it then transmits to the Fingerscan reader. The Fingerscan reader in turn would use the key to perform a key-dependent sampling operation using the Fingerscan technology to obtain a corresponding key-dependent biometric sample, which would then be compared and analyzed against the key-dependent biometric template received from the smart card.

An interloper who intercepts a key and key-dependent biometric template, or several such key and key-dependent biometric templates, may not have enough information to forge biometric data since the key selected by the Fingerscan technology would not necessarily match one of the keys intercepted by the interloper.

Hence, the interloper would not have the necessary biometric information to forge the biometric data. It will be understood that the security may depend on having a key-space large enough to provide that the interloper will not be able to collect enough of the biometric template to forge biometric data for an arbitrary key selected by the Fingerscan technology.

Accordingly, key-dependent sampling of a biometric characteristic may be used to allow secure transmission of biometric data from a client to a server without the need for encryption and/or signatures. Improved biometric sensing systems, methods and computer program products may thereby be provided.

Various aspects of the present invention were illustrated in detail in the figures, including flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the flowchart illustrations, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for securely transmitting biometric data from a client to a server comprising the steps of:
    performing key-dependent sampling of a biometric characteristic at the client by sampling the biometric characteristic at a sampling frequency that is a function of a key to thereby generate key-dependent biometric data samples; and
    transmitting the key-dependent biometric data samples from the client to the server.

2. A method according to claim 1 wherein the performing step is preceded by the step of transmitting a key from the server to the client and wherein the performing step comprises the step of using the key to perform the key-dependent sampling of the biometric characteristic at the client.

3. A method according to claim 2 wherein the step of transmitting comprises the steps of:
    transmitting a random number from the server to the client; and
    combining the random number and a secret value at the client; and
    wherein the step of performing comprises the step of performing key-dependent sampling using the combination of the random number and secret value.

4. A method according to claim 3 wherein the step of transmitting a random number is preceded by the step of transmitting the secret value from the server to the client.

5. A method according to claim 1 wherein the performing step further comprises the step of applying the key to the sampled biometric data to thereby generate the key-dependent biometric data samples.

6. A method according to claim 1 wherein the performing step comprises the step of:
    performing nonlinear key-dependent sampling of the biometric characteristic at the client to thereby generate the key-dependent biometric data samples.

7. A method according to claim 1 wherein the transmitting step is followed by the step of:
    comparing the key-dependent biometric data samples to at least one key-dependent biometric data template at the server.

8. A method according to claim 1 wherein the transmitting step comprises the step of transmitting the key-dependent biometric data samples from the client to the server over the Internet.

9. A method for processing biometric data from a client at a server comprising the steps of:
    performing key-dependent sampling of at least one biometric characteristic template at the server by sampling the biometric characteristic at a sampling frequency that is a function of a key to thereby generate key-dependent biometric template data samples; and
    comparing the key-dependent biometric template data samples with the biometric data from the client.

10. A method according to claim 9 wherein the performing step further comprises the step of applying the key to the sampled biometric template data to thereby generate the key-dependent biometric template data samples.

11. A method according to claim 9 wherein the performing step comprises the step of:
    performing nonlinear key-dependent sampling of the at least one biometric characteristic template at the server to thereby generate the key-dependent biometric template data samples.

12. A client system for securely transmitting biometric data comprising:
    means for performing key-dependent sampling of a biometric characteristic by sampling the biometric characteristic at a sampling frequency that is a function of a key to thereby generate key-dependent biometric data samples; and
    means for transmitting the key-dependent biometric data samples to a server.

13. A system according to claim 12 further comprising means for receiving a key from the server and wherein the means for performing comprises means for using the key to perform the key-dependent sampling of the biometric characteristic.

14. A system according to claim 12 wherein the means for performing further comprises:
    means for applying the key to the sampled biometric data to thereby generate the key-dependent biometric data samples.

15. A system according to claim 12 wherein the means for performing comprises:
    means for performing nonlinear key-dependent sampling of the biometric characteristic to thereby generate the key-dependent biometric data samples.

16. A system according to claim 12 wherein the means for performing comprises means for performing key-dependent sampling of a biometric characteristic template to thereby generate key-dependent biometric data template samples.

17. A system according to claim 12 wherein the means for performing comprises:
    means for receiving a random number from the server;
    means for combining the random number and a secret value at the client; and
    means for performing key-dependent sampling using the combined random number and secret value.

18. A system according to claim 17 wherein the means for performing further comprises means for receiving the secret value from the server.

19. A system according to claim 12 wherein the means for transmitting comprises a web browser that transmits the key-dependent biometric data samples to the server over the Internet.

20. A server system for processing biometric data comprising:
    means for performing key-dependent sampling of at least one biometric characteristic template by sampling the biometric characteristic at a sampling frequency that is a function of a key to thereby generate key-dependent biometric template data samples; and
    means for comparing the key-dependent biometric template data samples with biometric data from a client.

21. A system according to claim 20 wherein the means for performing further comprises:
    means for applying the key to the sampled biometric template data to thereby generate the key-dependent biometric template data samples.

22. A system according to claim 20 wherein the means for performing comprises:

means for performing nonlinear key-dependent sampling of the at least one biometric characteristic template to thereby generate the key-dependent biometric template data samples.

23. A computer program product for securely transmitting biometric data the computer program product comprising a computer-readable storage medium having computer-readable program code means embodied in the medium, the computer-readable program code means comprising:

computer-readable program code means for performing key-dependent sampling of a biometric characteristic by sampling the biometric characteristic at a sampling frequency that is a function of a key to thereby generate key-dependent biometric data samples; and computer-readable program code means for transmitting the key-dependent biometric data samples.

24. A computer program product according to claim 23 further comprising computer-readable program code means for receiving a key and wherein the means for performing comprises means for using the key to perform the key-dependent sampling of the biometric characteristic.

25. A computer program product according to claim 23 wherein the computer-readable program code means for performing further comprises:

computer-readable program code means for applying the key to the sampled biometric data to thereby generate the key-dependent biometric data samples.

26. A computer program product according to claim 23 wherein the computer-readable program code means for performing comprises:

computer-readable program code means for performing nonlinear key-dependent sampling of the biometric characteristic to thereby generate the key-dependent biometric data samples.

27. A computer program product according to claim 23 wherein the computer-readable program code means for performing comprises computer-readable program code means for performing key-dependent sampling of a biometric characteristic template to thereby generate key-dependent biometric data template samples.

28. A computer program product according to claim 23 wherein the computer-readable program code means for performing comprises:

computer-readable program code means for receiving a random number;

computer-readable program code means for combining the random number and a secret value; and computer-readable program code means for performing key-dependent sampling using the combined random number and secret value.

29. A computer program product according to claim 28 wherein the computer-readable program code means for performing further comprises computer-readable program code means for receiving the secret value.

30. A computer program product according to claim 23 wherein the computer-readable program code means for transmitting comprises a web browser that transmits the key-dependent biometric data samples over the Internet.

31. A computer program product system for processing biometric data, the computer program product comprising a computer-readable storage medium having computer-readable program code means embodied in the medium, the computer-readable program code means comprising:

computer-readable program code means for performing key-dependent sampling of at least one biometric characteristic template by sampling the biometric characteristic at a sampling frequency that is a function of a key to thereby generate key-dependent biometric template data samples; and computer-readable program code means for comparing the key-dependent biometric template data samples with biometric data.

32. A computer program product according to claim 31 wherein the computer-readable program code means for performing further comprises:

computer-readable program code means for applying the key to the sampled biometric template data to thereby generate the key-dependent biometric template data samples.

33. A computer program product according to claim 31 wherein the computer-readable program code means for performing comprises:

computer-readable program code means for performing nonlinear key-dependent sampling of the at least one biometric characteristic template to thereby generate the key-dependent biometric template data samples.

34. A method for securely transmitting biometric data from a client to a server comprising the steps of:

acquiring key-dependent biometric data samples by acquiring biometric characteristic samples of a user at the client utilizing a sampling characteristic that is dependent on a key value; and transmitting the key-dependent biometric data samples from the client to the server.

35. The method of claim 34, wherein the step of acquiring key-dependent biometric data samples comprises acquiring biometric characteristic samples of a user at the client utilizing a sampling characteristic that is a non-linear function of the key value to thereby generate the key-dependent biometric data samples.

36. The method of claim 35, wherein the sampling characteristic comprises a sampling frequency and wherein the biometric characteristic is sampled utilizing a sampling frequency that is a non-linear function of the key value.

37. The method of claim 34, wherein the step of transmitting the key-dependent biometric data samples from the client to the server comprises transmitting the key-dependent biometric data samples from the client to the server in the clear.

38. A system for securely transmitting biometric data from a client to a server comprising:

means for acquiring key-dependent biometric data samples by acquiring biometric characteristic samples of a user at the client utilizing a sampling characteristic that is dependent on a key value; and means for transmitting the key-dependent biometric data samples from the client to the server.

39. The system of claim 38, wherein the means for acquiring key-dependent biometric data samples comprises means for acquiring biometric characteristic samples of the user at the client utilizing a sampling characteristic that is a non-linear function of the key value to thereby generate the key-dependent biometric data samples.

40. The system of claim 39, wherein the sampling characteristic comprises a sampling frequency and wherein the biometric characteristic is sampled utilizing a sampling frequency that is a non-linear function of the key value.

41. The method of claim 38, wherein the means for transmitting the key-dependent biometric data samples from the client to the server comprises means for transmitting the key-dependent biometric data samples from the client to the server in the clear.

42. A computer program product for securely transmitting biometric data from a client to a server comprising:

a computer readable storage medium having computer readable program code embodied therein, the computer readable program code comprising:

computer readable program code configured to acquire key-dependent biometric data samples by acquiring biometric characteristic samples of a user at the client utilizing a sampling characteristic that is dependent on a key value; and computer readable program code configured to transmit the key-dependent biometric data samples from the client to the server.

43. The computer program product of claim 42, wherein the computer readable program code configured to acquire key-dependent biometric data samples comprises computer readable program code configured to acquire biometric characteristic samples from the user at the client utilizing a sampling characteristic that is a non-linear function of the key value to thereby generate the key-dependent biometric data samples.

44. The computer program product of claim 43, wherein the sampling characteristic comprises a sampling frequency and wherein the biometric characteristic is sampled utilizing a sampling frequency that is a non-linear function of the key value.

45. The computer program product of claim 42, wherein the computer readable program code configured to transmit the key-dependent biometric data samples from the client to the server comprises computer readable program code configured to transmit the key-dependent biometric data samples from the client to the server in the clear.

* * * * *